United States Patent [19]

Markisello

[11] Patent Number: 5,402,661
[45] Date of Patent: Apr. 4, 1995

[54] TOOL AND METHOD FOR TURNING ON FORD SIDEBAR TYPE IGNITION LOCK CYLINDERS

[76] Inventor: Frank Markisello, 9-10 Liberty Ave., Ozone Park, N.Y. 11417

[21] Appl. No.: 850,791

[22] Filed: Mar. 13, 1992

[51] Int. Cl.6 ............................................. E05B 19/20
[52] U.S. Cl. ............................... 70/394; 29/426.4; 81/53.2; 70/368; 70/404; 70/422; 70/465; 70/495
[58] Field of Search ............... 70/394, 404, 422, 466, 70/465, DIG. 7, 495, 496, 368, 371; 81/53.2, 181; 29/426.1, 426.4; 33/539, 540

[56] References Cited

U.S. PATENT DOCUMENTS

| | | | |
|---|---|---|---|
| 861,030 | 7/1907 | Hansen | 81/120 |
| 885,926 | 4/1908 | Horst | 81/53.2 |
| 1,179,680 | 4/1916 | Tallyn | 81/53.2 |
| 1,300,275 | 4/1919 | Johnson | 81/120 |
| 1,705,344 | 3/1929 | Thompson | 70/422 |
| 1,724,312 | 8/1929 | Pugh | 81/53.2 |
| 2,750,821 | 6/1956 | Hilsinger | 81/53.2 |
| 2,906,148 | 9/1959 | Mikeska | 70/466 |
| 3,106,233 | 10/1963 | Wolny | 81/53.2 |
| 4,056,955 | 11/1977 | Glass | 70/422 |
| 4,074,548 | 2/1978 | Milton | 70/422 X |
| 4,261,093 | 4/1981 | Steffen et al. | 408/79 X |
| 4,292,995 | 10/1981 | Mazzola | 70/408 X |
| 4,300,416 | 11/1981 | Ross | 70/394 X |
| 4,586,233 | 5/1986 | Markisello | 70/417 X |
| 4,607,547 | 8/1986 | Martus | 81/181 X |
| 4,671,141 | 6/1987 | Hanson | 81/53.2 |
| 4,682,398 | 7/1987 | Markisello | 70/417 X |
| 4,827,593 | 5/1989 | Markisello | 29/402.19 X |

Primary Examiner—l
Assistant Examiner—Lloyd A. Gall

[57] ABSTRACT

A tool to start ignition side bar type lock cylinders in all Ford vehicles is provided and consists of using a tool which has a guide key to hold the tool in place, two tabs to cut into the face of the cylinder, a hexagonal shape at rear of tool to accept a wrench for turning the cylinder to the ON position and thus start the vehicle.

4 Claims, 1 Drawing Sheet

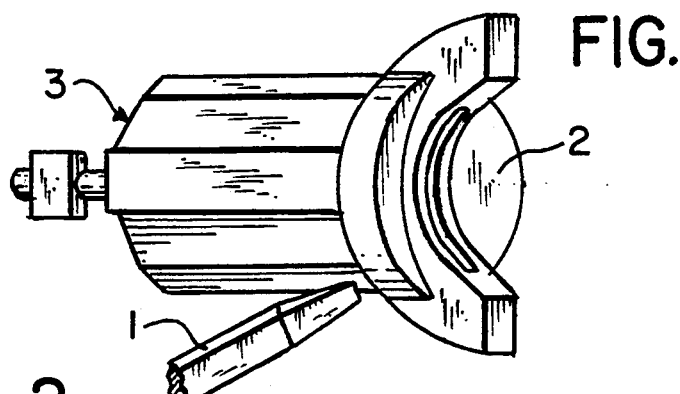
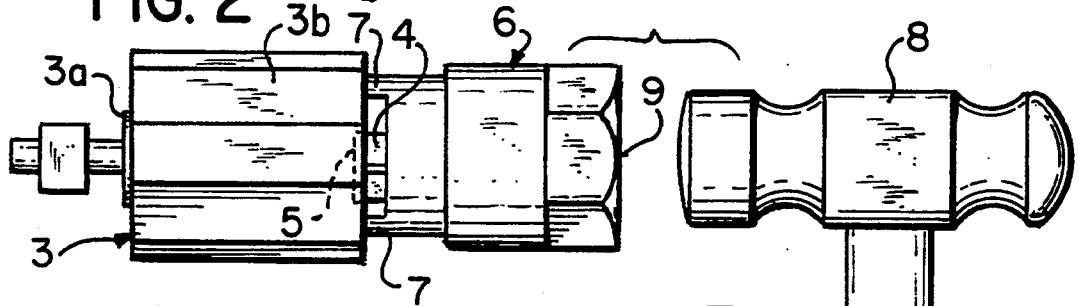
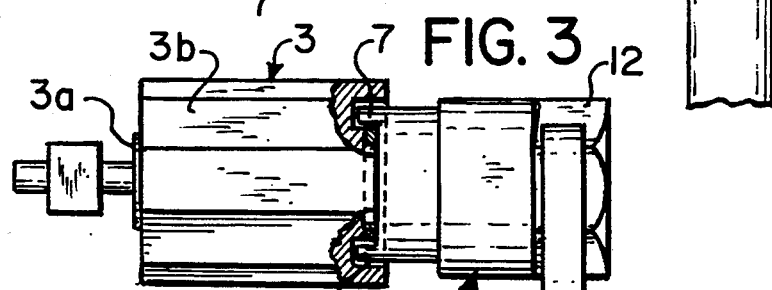
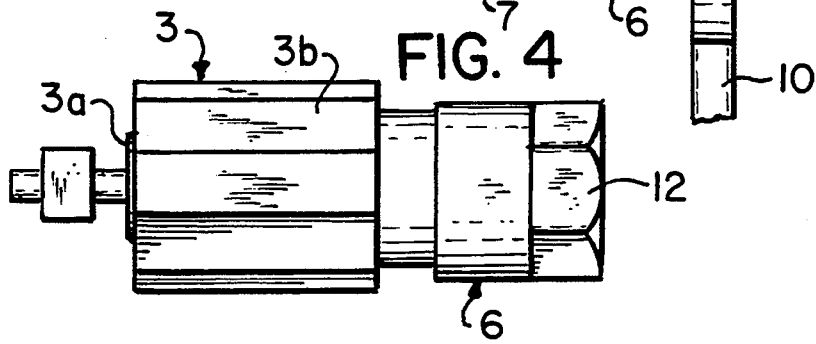
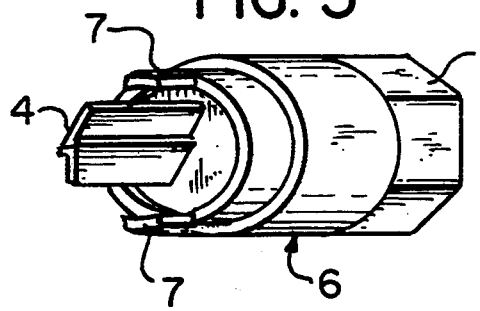
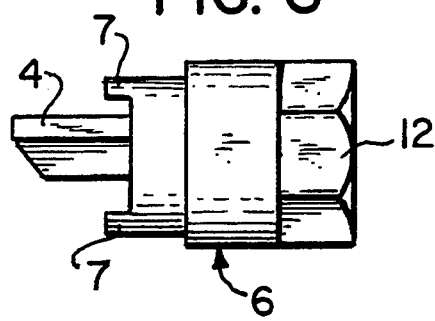

TOOL AND METHOD FOR TURNING ON FORD SIDEBAR TYPE IGNITION LOCK CYLINDERS

BACKGROUND OF THE INVENTION

1. Field of Invention

The instant invention relates generally to lock cylinders and more specifically it relates to a tool to turn and a method for turning all Ford ignition sidebar type cylinders to the ON position, so the vehicle can be started or to remove the lock.

2. Description of the Prior Art

Numerous lock cylinders have been provided in the prior art that are adapted to be used as Ford ignition locks. There is nothing on the market today that will turn the Ford ignition side bar type cylinders to the ON position, manufactured from mid-1984 and still in use.

Since there are no prior art units suitable for the particular purpose stated above, there is a need for the present invention as hereinafter described.

SUMMARY OF THE INVENTION

A principal object of the present invention is to provide a tool and method for turning Ford ignition cylinders having a side bar which prevents the cylinder from being turned to the ON position without a key in use from mid-1984 through the present.

The method of the present invention is practiced by utilizing a tool which has a guide key to guide the tool into place, and, two cutter tabs projecting forward from the front edge of the tool and positioned diametrically opposite each other. These tabs will be driven into the outer diameter of the lock cylinder face by striking the rear of the tool with a hammer. Once these tabs are in place embedded in the cylinder, they will supply the torque needed to turn the cylinder to the ON position. At the rear of the tool, there is a hexagonal shape to enable one to turn the tool with a socket or wrench. In turn the two tabs which were driven into the outer diameter of the cylinder, will then turn the cylinder to the ON position to start the vehicle.

A further object is to provide a tool and method of turning the Ford ignition side bar type cylinders to the ON position, whereby the tool is economical to manufacture.

A still further object is to provide a tool and method of turning Ford ignition side bar type cylinders to the ON position, where the tool is simple and easy to use.

To the accomplishment of the above and related objects, this tool may be embodied in form illustrated in the accompanying drawings, attention being called to the fact however, that the drawings are illustrative only, and that changes may be made in specific construction illustrated and described within the scope of the appended claims.

BRIEF DESCRIPTION OF THE DRAWING FIGURES

FIG. 1 is an exploded perspective view of a screwdriver being used to pry off the wing nut from the face of a sidebar type Ford ignition lock;

FIG. 2 is an exploded side elevational view of the tool's guide key being introduced into the cylinder keyway to hold the tool in place, the two tabs also being in place ready to cut into the edge of the lock cylinder face, and the hammer being used to drive the tabs into the lock cylinder face;

FIG. 3 is a side elevational view partially broken away of the tool in place, flush to the cylinder face, the two tabs in place ready to turn the cylinder, a wrench being slid over the hexagonal shape at rear of tool to turn the cylinder to the ON position;

FIG. 4 is a side elevational view of the cylinder turned to the ON position;

FIG. 5 is a front right perspective view of a tool embodying the features of this invention; and FIG. 6 is a side elevational view of the tool of FIG. 5.

DETAILED DESCRIPTION OF THE PREFERRED EMBODIMENTS

Turning now descriptively to the drawings in which similar reference characters denote similar elements throughout the several views, FIGS. 5 and 6 best illustrate the basic parts of the invention.

Tool 6, as best seen in FIGS. 5 and 6 has a substantially cylindrical body, with diametrically opposed tabs 7 projecting forward from tool 6's front peripheral edge, the diameter of which matches that of the Ford ignition lock cylinder. Each of the pair of tabs 7 has an outer surface sloped with respect to the face of tool 6, providing a sharp edge for cutting action when tool 6 is used as described hereinafter. From the central front portion of tool 6, guide key 4 projects forwardly for positioning and aligning tool 6 properly when in use. Rear end 12 of tool 6 is hexagonally shaped to permit effective gripping and turning of tool 6.

To understand how tool 6 is used, the following steps are described and illustrated in FIGS. 1 through 4: for turning Ford ignition side bar type cylinders to the ON position to start vehicle;

1. Using a screwdriver 1, pry wing nut 2 off, from ignition cylinder lock 3.
2. Insert guide key 4 into keyway 5 to hold tool 6 and tabs 7 in place, take hammer 8 and strike rear of tool 9 so tabs 7 cut into face of cylinder 3a in housing 3b of lock 3.
3. With tool 6 in place and tabs 7 having cut into face of cylinder 3a, take a wrench 10 and slide it over the hexagonal shaped rear 12, turn tool 6, thus causing tabs 7 to turn cylinder 3a to the ON position within lock housing 3b.

What is claimed is:

1. A method of turning a cylinder of a sidebar type ignition lock in a Ford vehicle, by using a tool having a substantially cylindrical tool body, a plurality of cutting tabs extending forwardly from a circumferential front edge of the tool body, a guide key extending forwardly from a central front portion of the tool body, and a rear end portion of the tool body being shaped hexagonally, the method comprising the steps of:

a) prying off a wing nut from the Ford ignition lock;
   b) inserting the tool's guide key into the Ford lock cylinder's keyway, thus aligning the tool with the cylinder;
   c) hammering the rear end portion of the tool to drive the plurality of cutting tabs into an outer edge portion of the ignition lock cylinder; and
   d) turning the tool by means of a wrench engaging and rotating the tool's rear end hexagonally shaped portion, so that the embedded tool's tabs exert torque on and force the ignition lock cylinder to turn to its ON position.

2. Tool for turning an ignition lock cylinder of and for starting Ford vehicles equipped with sidebar type ignition locks in use since mid-1984, which comprises:

a substantially cylindrical tool body, a circular front end of said tool body having an outside diameter substantially equal to an outside diameter of the Ford ignition cylinder;

a plurality of tabs extending forwardly from the peripheral edge of said circular front end of said tool body, each of said tabs having at least one outer surface sloped with respect to said circular front end to provide cutting edges to said tabs;

a guide key mounted on and extending forwardly from the central portion of said circular front end of said tool body, said guide key being positioned for insertion into a keyway of, and for alignment of the tool with, the Ford ignition cylinder; and a rearward portion of said tool body being hexagonally shaped to accommodate a wrench for turning said tool body.

3. Lock-cylinder-turning tool as defined in claim 2, wherein said plurality of tabs comprises a pair of said tabs positioned diametrically opposite each other.

4. In combination with the lock-cylinder-turning tool as defined in claim 2, the sidebar type ignition lock used in Ford vehicles since mid-1984.

* * * * *